United States Patent
Chao et al.

(10) Patent No.: US 8,526,559 B2
(45) Date of Patent: Sep. 3, 2013

(54) COMMUNICATION SYSTEMS AND CLOCK GENERATION CIRCUITS THEREOF WITH REFERENCE SOURCE SWITCHING

(75) Inventors: Kuan-Hua Chao, Taipei County (TW); Shiue-Shin Liu, HsinChu (TW); Tse-Hsiang Hsu, Hsin-Chu (TW)

(73) Assignee: Mediatek Inc., Hsin-Chu (TW)

( * ) Notice: Subject to any disclaimer, the term of this patent is extended or adjusted under 35 U.S.C. 154(b) by 1034 days.

(21) Appl. No.: 12/410,502

(22) Filed: Mar. 25, 2009

(65) Prior Publication Data

US 2009/0296870 A1   Dec. 3, 2009

Related U.S. Application Data

(60) Provisional application No. 61/057,228, filed on May 30, 2008.

(51) Int. Cl.
*H03D 3/24* (2006.01)

(52) U.S. Cl.
USPC ........................................................ 375/376

(58) Field of Classification Search
USPC .......... 375/354–355, 359, 362, 373, 376–377; 327/156; 331/1 R, 47, 49; 713/400, 500, 713/503, 600
See application file for complete search history.

(56) References Cited

U.S. PATENT DOCUMENTS

| | | | |
|---|---|---|---|
| 5,065,384 A | 11/1991 | Yokogawa | |
| 5,319,680 A | 6/1994 | Port et al. | |
| 5,483,201 A | 1/1996 | Bortolini | |
| 5,530,389 A | 6/1996 | Rieder | |
| 5,564,042 A | 10/1996 | Ventrone et al. | |
| 6,297,705 B1 | 10/2001 | Williams et al. | |
| 6,349,391 B1 * | 2/2002 | Petivan et al. | 714/11 |
| 6,469,553 B1 * | 10/2002 | Sung et al. | 327/156 |
| 6,525,578 B2 | 2/2003 | Ooishi | |
| 6,606,365 B1 | 8/2003 | Chen | |
| 6,639,442 B1 * | 10/2003 | Ghameshlu et al. | 327/293 |
| 6,731,709 B2 * | 5/2004 | Doblar | 375/357 |
| 6,795,043 B2 | 9/2004 | Shibata | |
| 7,065,025 B2 | 6/2006 | Kiyose | |

(Continued)

FOREIGN PATENT DOCUMENTS

| | | |
|---|---|---|
| CN | 1104818 | 7/1995 |
| CN | 1953332 | 4/2007 |

(Continued)

OTHER PUBLICATIONS

English language translation of abstract of CN 1953332 (published Apr. 25, 2007).

(Continued)

*Primary Examiner* — Juan A Torres
(74) *Attorney, Agent, or Firm* — McClure, Qualey & Rodack, LLP

(57) ABSTRACT

A clock generation circuit for a transmitter which transmits data according to an output clock signal is provided. The clock generation circuit include a clock generator and a phase locked loop (PLL). The clock generator generates a first clock signal. The PLL initially generates the output clock signal according to the first clock signal. When a frequency of the output clock signal generated according to the first clock signal is not within a range required for specification of the transmitter, the PLL generates the output clock signal according to a second clock signal.

11 Claims, 6 Drawing Sheets

(56) References Cited

U.S. PATENT DOCUMENTS

| | | |
|---|---|---|
| 7,082,177 B2 | 7/2006 | Arkiszewski |
| 7,194,059 B2 | 3/2007 | Wong et al. |
| 7,263,153 B2 | 8/2007 | Sutioso et al. |
| 7,743,168 B2 | 6/2010 | Tang et al. |
| 7,839,965 B2 | 11/2010 | Wilson et al. |
| 2004/0071251 A1 | 4/2004 | Sutioso et al. |
| 2004/0113704 A1 | 6/2004 | Ho |
| 2006/0119443 A1 | 6/2006 | Azam et al. |
| 2006/0120489 A1 | 6/2006 | Lee |
| 2007/0069825 A1 | 3/2007 | Wong et al. |
| 2007/0195916 A1 | 8/2007 | Itahara |
| 2007/0226531 A1 | 9/2007 | Park et al. |
| 2007/0297553 A1 | 12/2007 | Sutioso et al. |
| 2008/0224782 A1* | 9/2008 | Fan et al. ............ 331/2 |
| 2009/0033380 A1* | 2/2009 | McCoy ............ 327/156 |
| 2009/0189801 A1 | 7/2009 | Forstner et al. |
| 2011/0102258 A1 | 5/2011 | Underbrink et al. |

FOREIGN PATENT DOCUMENTS

| | | |
|---|---|---|
| TW | 200713835 | 4/2011 |
| TW | 200723703 | 7/2011 |
| WO | WO 2006/011680 | 2/2006 |

OTHER PUBLICATIONS

English language translation of abstract of CN 1104818 (published Jul. 5, 1995).

* cited by examiner

COMMUNICATION SYSTEMS AND CLOCK GENERATION CIRCUITS THEREOF WITH REFERENCE SOURCE SWITCHING

CROSS REFERENCE TO RELATED APPLICATIONS

The present application claims the benefit of U.S. provisional application entitled "FREQUENCY COMPENSATION METHOD WITH REFERENCE SOURCE SWITCHING", Ser. No. 61/057,228, filed May 30, 2008.

BACKGROUND OF THE INVENTION

1. Field of the Invention

The invention relates to a clock generation circuit, and more particularly to a clock generation circuit having an output clock signal within a specification defined frequency ppm range.

2. Description of the Related Art

FIG. 1 shows a conventional transmission device 1, which comprises a transmitter 10, a phase locked loop (PLL) circuit 11, and a clock generator 12. The clock generator 12 generates a reference clock signal CLKref, which is provided to the PLL circuit 11. The PLL circuit 11 generates a clock signal TXCLK to the transmitter 10 according to the reference clock signal CLKref, and the transmitter 10 transmits data with the clock signal TXCLK. Since the clock signal TXCLK is generated according to the reference clock signal CLKref, the frequency ppm range of the clock signal TXCLK is dominated by that of the reference clock signal CLKref, such as the specification of SATA (Serial Advanced Technology Attachment) restricts output clock frequency within +/−350 ppm without using a spread spectrum clock (SSC) component. The specification of a high-speed link usually defines a ppm range for frequency of transmitted data. If the frequency of the reference clock signal CLKref does not conform to the defined frequency ppm range of the specification, the frequency of the clock TXCLK is hard to conform to the defined frequency ppm range, so that the transmitted data eventually does not meet the specification.

In general, the clock generator 12 is implemented by an on-board clock source, such as a crystal or a resonator. A crystal has a concentrated frequency ppm range; however, compared with a resonator, the crystal has a higher cost. In the other hand, it is difficult to control the frequency of the resonator, which is a cheaper choice of the clock generator 12, to conform to a frequency ppm range defined by a required specification. Thus, if a resonator is used for implementation for lower costs, it is likely that the frequency of the reference clock signal CLKref will possible not conform to the defined ppm range.

Thus, it is desired to provide a clock generation device for a transmitter, which uses a low-cost reference clock generator and generates a clock signal whose frequency conforms to the frequency ppm range defined by a specification, so that the output data of the transmitter meet the specification.

BRIEF SUMMARY OF THE INVENTION

An exemplary embodiment of a clock generation circuit for a transmitter which transmits data according to an output clock signal is provided. The clock generation circuit comprises a clock generator and a phase locked loop (PLL). The clock generator generates a first clock signal. The PLL initially generates the output clock signal according to the first clock signal. When a frequency of the output clock signal generated according to the first clock signal is not within a range required for specification of the transmitter, the PLL generates the output clock signal according to a second clock signal.

An exemplary embodiment of a device communicating with a host is provided. The device comprises a receiver, a phase locked loop (PLL), and a transmitter. The receiver receives and recovers host data from the host to generate a host clock signal. The PLL generates an output clock signal according to the host clock signal. The transmitter transmits device data according to the output clock signal.

In some embodiments, the device further comprises a clock generator to generate a local clock signal. Before the receiver receives the host data, the PLL generates the output clock signal according to the local clock signal. After the receiver receives the host data, the PLL generates the output clock signal according to the host clock signal when a frequency of the output clock signal generated according to the local clock signal is not within a range required for specification of the transmitter.

An exemplary embodiment of a communication system is provided. The communication system comprises a host and a device. The host comprises a host transmitter and a host receiver. The host transmitter transmits host data. The device communicates with the host and receives the host data. The device comprises a receiver, a phase locked loop (PLL), and a device transmitter. The receiver receives and recovers the host data to generate a host clock signal. The PLL generates an output clock signal according to the host clock signal. The device transmitter transmits device data to the host transmitter according to the output clock signal.

In some embodiments, the device further comprises a clock generator to generate a local clock signal. Before the device receiver receives the host data from the host transmitter, the PLL generates the output clock signal according to the local clock signal. After the receiver receives the host data from the host transmitter, the PLL generates the output clock signal according to the host clock signal when a frequency of the output clock signal generated according to the local clock signal is not within a range required for specification of the transmitter.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
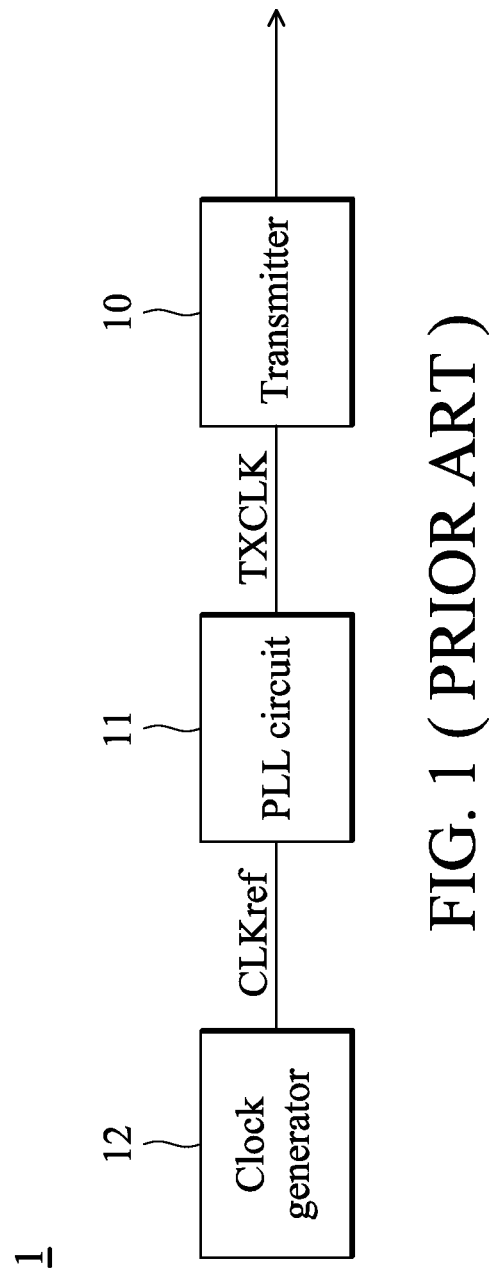
FIG. 1 shows a conventional transmission device with a frequency generator.
Figure 2:
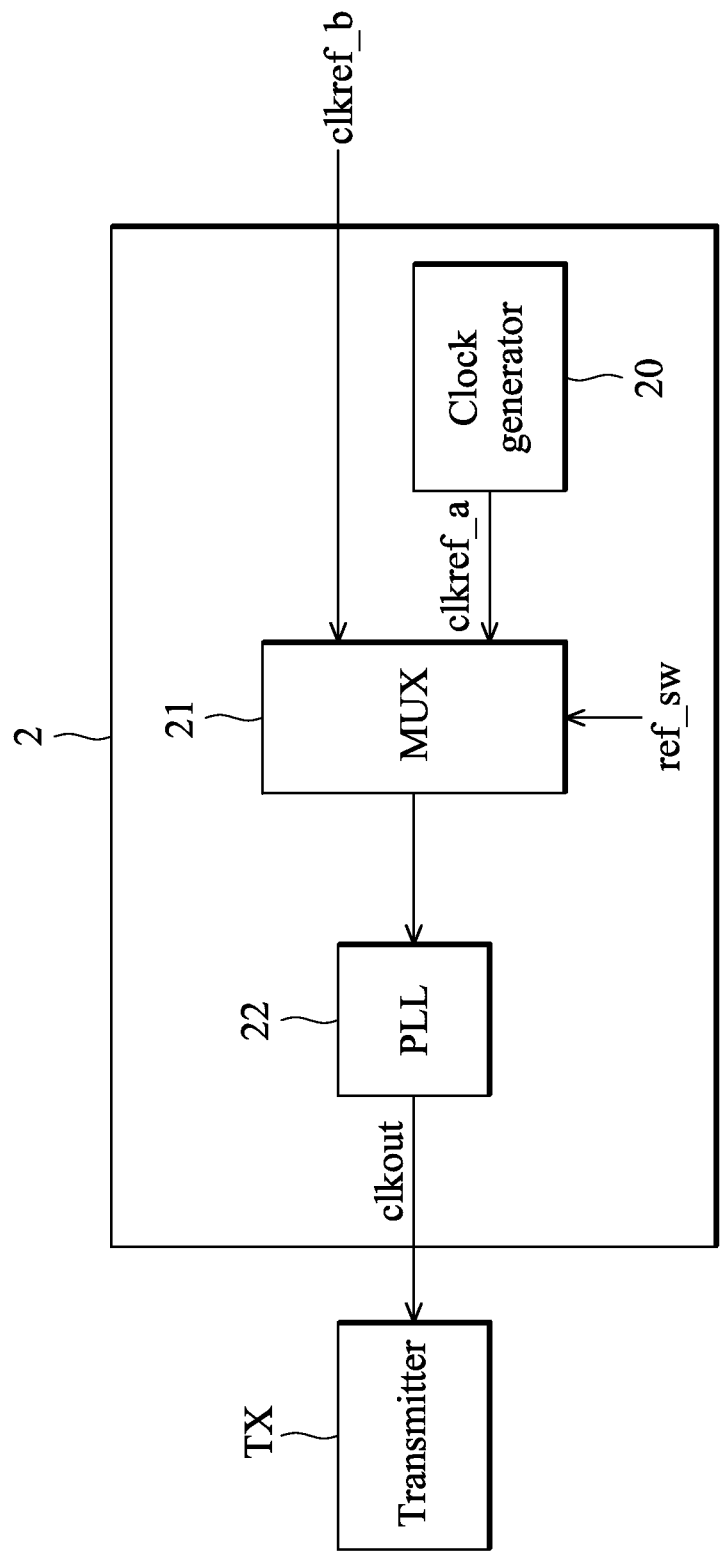
FIG. 2 shows an exemplary embodiment of a clock generation circuit.

Clock generation circuits are provided. In an exemplary embodiment of a clock generation circuit as shown in FIG. 2, a clock generation circuit 2 is arranged to generate an output clock clkout, and then the output clock signal clkout is provided to a transmitter TX. The frequency of the output clock signal clkout is expected to conform to a frequency ppm range defined by a required specification. The transmitter TX transmits data according to the output clock signal clkout. Referring to FIG. 2, the clock generation circuit 2 comprises a clock generator 20, a multiplexer (MUX) 21, and a phase locked loop (PLL). The clock generator 20 generates a clock signal clkref_a. In the embodiment, the clock generator 20 may be implemented by an on-board clock source, such as a crystal or resonator, and the clock signal clkref_a can be taken as a local clock signal. The multiplexer 21 receives the clock signal clkref_a and a precise clock signal clkref_b and selectively transmits the clock signal clkref_a or the clock signal clkref_b to the PLL 22 according to a switching signal ref_sw. In the embodiment of FIG. 2, the precise clock signal clkref_b is provided from an external device outside of the clock generation circuit 2 rather than an on-board clock or internally generated clock for the clock generation circuit 2, and the frequency of the precise clock signal clkref_b accurately conforms to the defined frequency ppm range.

Referring to FIG. 2, the multiplexer 21 is directed by the switching signal ref_sw to initially transmit the clock signal clkref_a to the PLL 22. The PLL 22 receives the clock signal clkref_a to serve as a reference clock signal and generates the output clock signal clkout according to the clock signal clkref_a. If the frequency of the clock signal clkref_a does not conform to the defined frequency ppm range, the frequency of the output clock signal clkout generated based on the clock signal clkref_a usually does not conform to the defined frequency ppm range very well, such that the data transmitted by the transmitter TX eventually does not meet the specification. Thus, when the frequency of the output clock signal clkout generated based on the clock signal clkref_a does not conform to the defined frequency ppm range, the multiplexer 21 is directed by the switching signal ref_sw to switch to transmit the precise clock signal clkref_b to the PLL 22. The PLL 22 then receives the precise clock signal clkref_b to serve as a reference clock signal and generates the output clock signal clkout according to the precise clock signal clkref_b. Since the frequency of the precise clock signal clkref_b accurately conforms to the defined frequency ppm range, the frequency of the output clock signal clkout generated based on the precise clock signal clkref_b also conforms to the defined frequency ppm range. Thus, the transmitter TX can transmit accurate data, and the data meets the specification.

According to above embodiment, the output clock signal clkout can be generated according to the precise clock signal clkref_b by the PLL 22 in order to conform to the defined frequency ppm range. Thus, if the clock generator 20 uses a low-cost element which is difficult to be controlled to conform to the defined frequency ppm range to generate the clock output clkref_a, then when the output clock signal clkout generated based on the clock signal clkref_a does not conform to the defined frequency ppm range, the PLL 22 can generate the output clock signal clkout for data transmission according to the precise clock signal clkref_b, and the frequency of the output clock signal clkout thus conforms to the defined frequency ppm range. Thus, the data transmitted by the transmitter TX would meet the specification.

It should be noted that the clock signal clkref_a or the clock signal clkref_b can be selected manually for inputting into the PLL 22 according to the type or quality of the clock generator 20. For example, if the clock generator 20 is not a qualified clock generator to generate the clock signal clkref_a with good quality, the user can select the clock signal clkref_b by the multiplexer 21 manually in some embodiments. However, in other embodiments, switching signal ref_sw can be generated by a decision unit (not shown), such as a comparator. The decision unit detects and decides the output clock signal clkout conforms to the defined frequency ppm range or not, and the switching signal ref_sw is generated thereby. Thus, the selection between the clock signals clkref_a and clkref_b can be operated automatically or even on-line operated.

Figure 3:
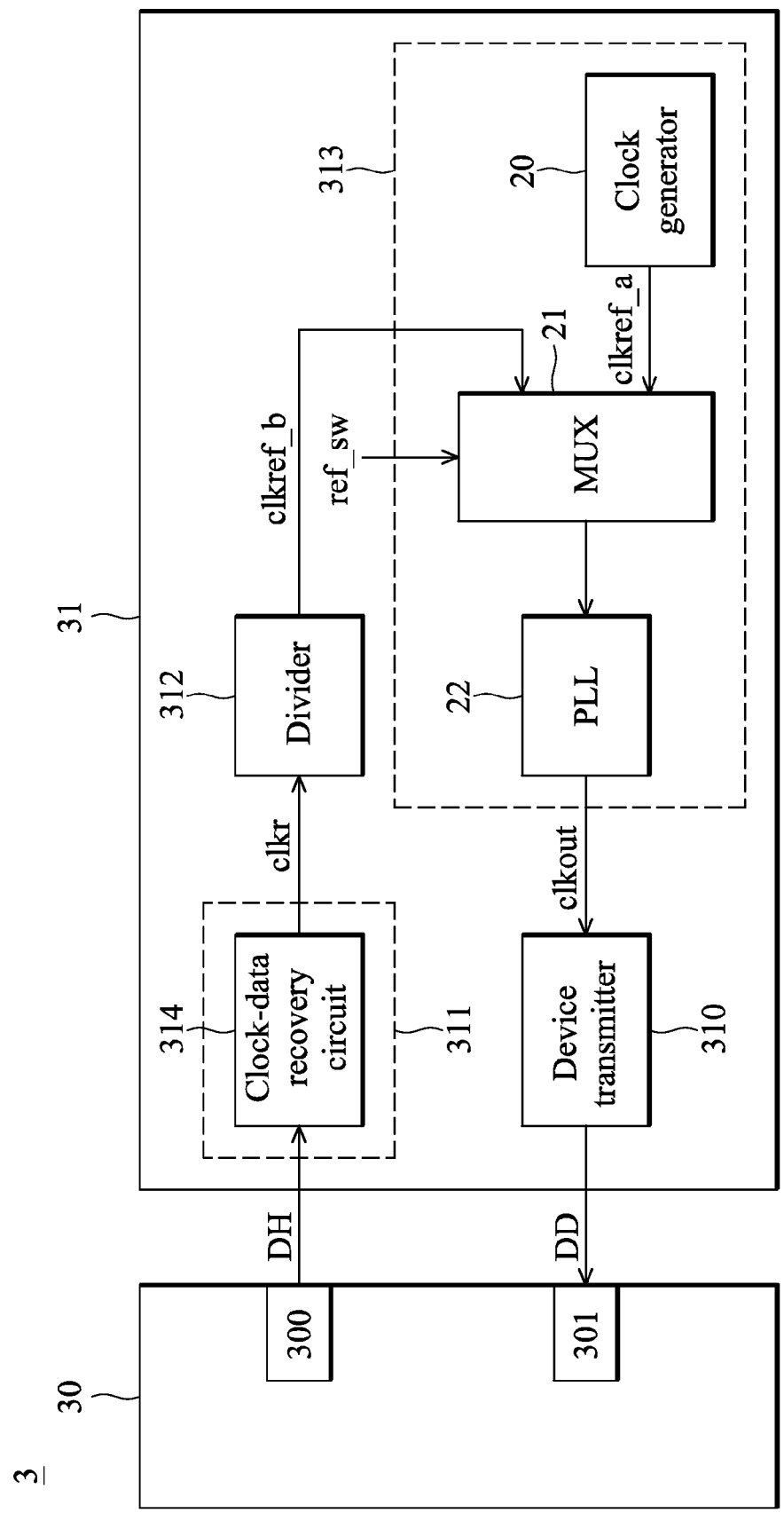
FIG. 3 shows an exemplary embodiment of a communication system.

In some embodiments, the clock generation circuit 2 shown in FIG. 2 can be applied in a communication system. Referring to FIG. 3, a communication system 3 comprises a host 30 and a device 31. The host 30 comprises a host transmitter 300 and a host receiver 301. The device 31 comprises a device transmitter 310, a device receiver 311, a clock generation circuit 313, and a divider 312. The host transmitter 300 of the host 30 transmits host data DH to the device receiver 311 of the device 31. The clock generation circuit 313 generates an output clock signal clkout, and the device transmitter 310 of the device 31 transmits device data DD to the host receiver 301 of the host 30 according to the output clock signal clkout. Referring to FIG. 3, the device receiver 311 comprises a clock-data recovery circuit 314. The clock generation circuit 313 is implemented by the same elements as the clock generation circuit 2 of FIG. 2. The same elements of the clock generation circuits 313 and 2 are labeled by the same references and perform the same operations. In the embodiment of FIG. 3, the clock-data recovery circuit 314 receives the host data DH from the host transmitter 300 and recovers the host data DH to generate a host clock signal clkr. The divider 312 receives the host clock signal clkr and divides the frequency of the host clock signal clkr to generate a clock signal clkref_b. In practice, the host clock signal clkr conforms to a frequency ppm range defined by a required specification of the communication system 3, thus, the divided clock signal clkref_b from the host clock signal clkr also conforms to the defined frequency ppm range.

As described above, the clock generator 20 of the clock generation circuit 313 generates a clock signal clkref_a. In the embodiment, the clock generator 20 may be implemented by an on-board clock source, such as a crystal or resonator. The multiplexer 21 receives the clock signal clkref_a from the clock generator 20 and the clock signal clkref_b from the divider 312 and selectively transmits the clock signal clkref_a or the clock signal clkref_b to the PLL 22 according to a switching signal ref_sw.

Referring to FIG. 3, before the device receiver 311 receives the host data DH from the host transmitter 300, the multiplexer 21 is directed by the switching signal ref_sw to transmit the clock signal clkref_a to the PLL 22. The PLL 22 receives the clock signal clkref_a to serve as a reference clock signal and generates the output clock signal clkout according to the clock signal clkref_a. If the frequency of the clock signal clkref_a does not conform to the defined frequency ppm range, the frequency of the output clock signal clkout generated based on the clock signal clkref_a usually does not conform to the defined frequency ppm range very well, so that the device data DD transmitted by the device transmitter 310 may eventually not meet the specification. Thus, after the device receiver 311 receives the host data DH from the host transmitter 300 and the host data DH is settled, when the frequency of the output clock signal clkout generated based on the clock signal clkref_a does not conform to the defined frequency ppm range, the multiplexer 21 is directed by the switching signal ref_sw to switch to transmit the clock signal clkref_b to the PLL 22. The PLL 22 then receives the clock signal clkref_b to serve as a reference clock signal and generates the output clock signal clkout according to the clock signal clkref_b. Since the frequency of the clock signal clkref_b accurately conforms to the defined frequency ppm range, the frequency of the output clock signal clkout generated based on the precise clock signal clkref_b also conforms to the defined frequency ppm rang. Thus, the device transmitter 310 can transmit accurate device data DD to the host 30, and the device data DD will meet the specification.

According to above embodiment, the output clock signal clkout can be generated according to the clock signal clkref_b which is derived from the host clock signal clkr in order to conform to the defined frequency ppm range of the communication system 3. Thus, if the clock generator 20 of the device 31 uses a low-cost element which is difficult to be controlled to conform to the defined frequency ppm range to generate the clock output clkref_a, then when the output clock signal clkout generated based on the clock signal clkref_a does not conform to the defined frequency ppm range, the PLL 22 can generate the output clock signal clkout for data transmission according to the clock signal clkref_b, and the frequency of the output clock signal clkout thus conforms to the defined frequency ppm range. Accordingly, the device data DD transmitted by the device transmitter 310 would met the specification of the communication system 3.

Figure 4:
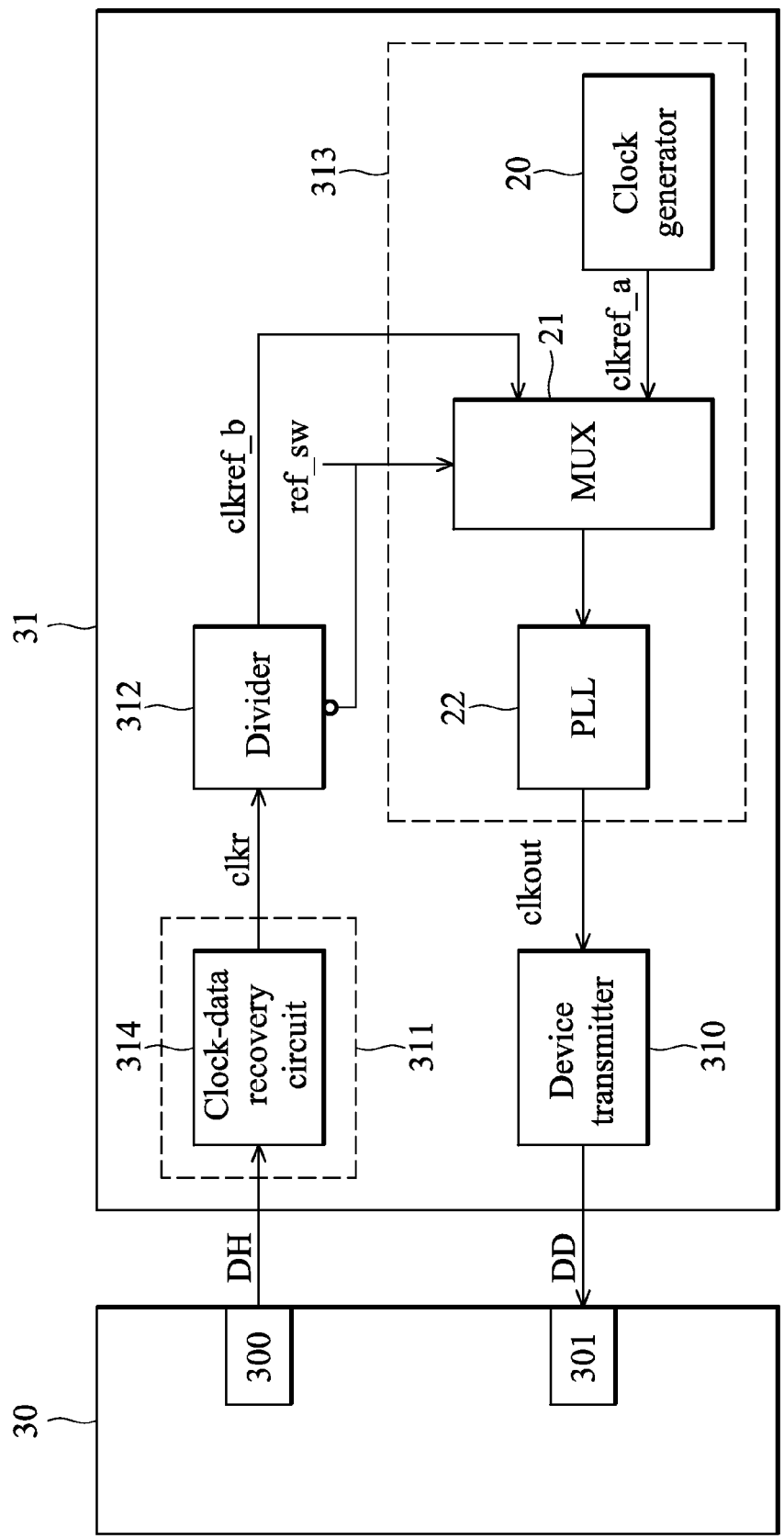
FIG. 4 shows another exemplary embodiment of a communication system.

Referring to FIG. 4, the switching signal ref_sw is further provided to the divider 312. In some embodiments, as shown in FIG. 4, in order to prevent the device data DD from being unstable due to undesired transient response, the divider 312 is reset by the switching signal ref_sw before the PLL 22 generates the output clock signal clkout according to the clock signal clkref_b.

Figure 5:
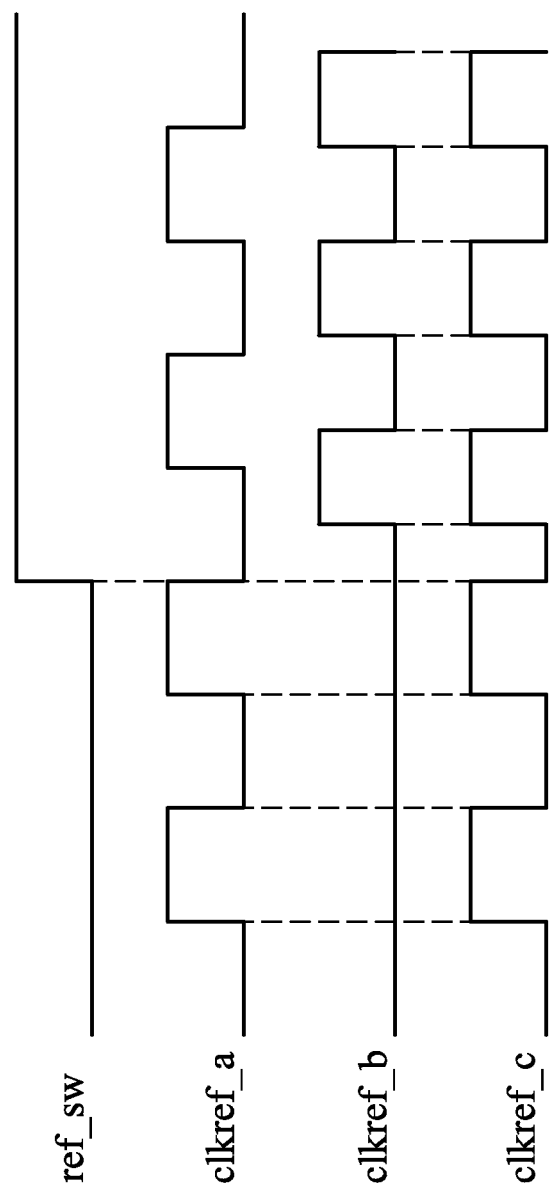
FIG. 5 shows waveforms of the clock signals and a switching signal.

FIG. 5 shows waveforms of the clock signals clkref_a, clkref_b, and clkref_c and the switching signal ref_sw, wherein the clock signal clkref_c represents the output of the multiplexer 21. Before the PLL 22 generates the output clock signal clkout according to the clock signal clkref_b, the switching signal ref_sw is at a low level to reset the divider 312, so that the level of the clock signal clkref_b is not changed with the host clock signal clkr and is kept at a low level. At this time, the phase of the clock signal clkref_c output from the multiplexer 21 is changed with the clock signal clkref_a. That is, the multiplexer 21 selects the clock signal clkref_a to serve as the clock signal clkref_c for the PLL 22. When the switching signal ref_sw controls the multiplexer 21 to transmit the clock signal clkref_b to the PLL 22, the switching signal ref_sw simultaneously switches to a high level to stop resetting the divider 312. The divider 312 can operate normally to generate the clock signal clkref_b according to the host clock signal clkr. At this time, the phase of the clock signal clkref_c is changed with the clock signal clkref_b. That is, the multiplexer 21 selects the clock signal clkref_b to serve as the clock signal clkref_c for PLL 22. In a preferred embodiment, referring to FIG. 5, the timing for switching the level of the switching signal ref_sw is when the phase difference between the clock signals clkref_a and clkref_b is small. Thus, the change between the phase of the clock signal clkref_c obtained from the clock signal clkref_a and the phase of the clock signal clkref_c obtained from the clock signal clkref_b would also be small. Accordingly, the transient response of the PLL 22 would be less, and the device data DD would be stable. In FIG. 5, the pulse widths of the clock signals clkref_a and clkref_b are given as an example for clearly showing the switching between the clock signals clkref_a and clkref_b in the clock signal clkref_c. There is no any implication for a particular ratio relationship between the pulse widths of the clock signals clkref_a and clkref_b.

Figure 6:
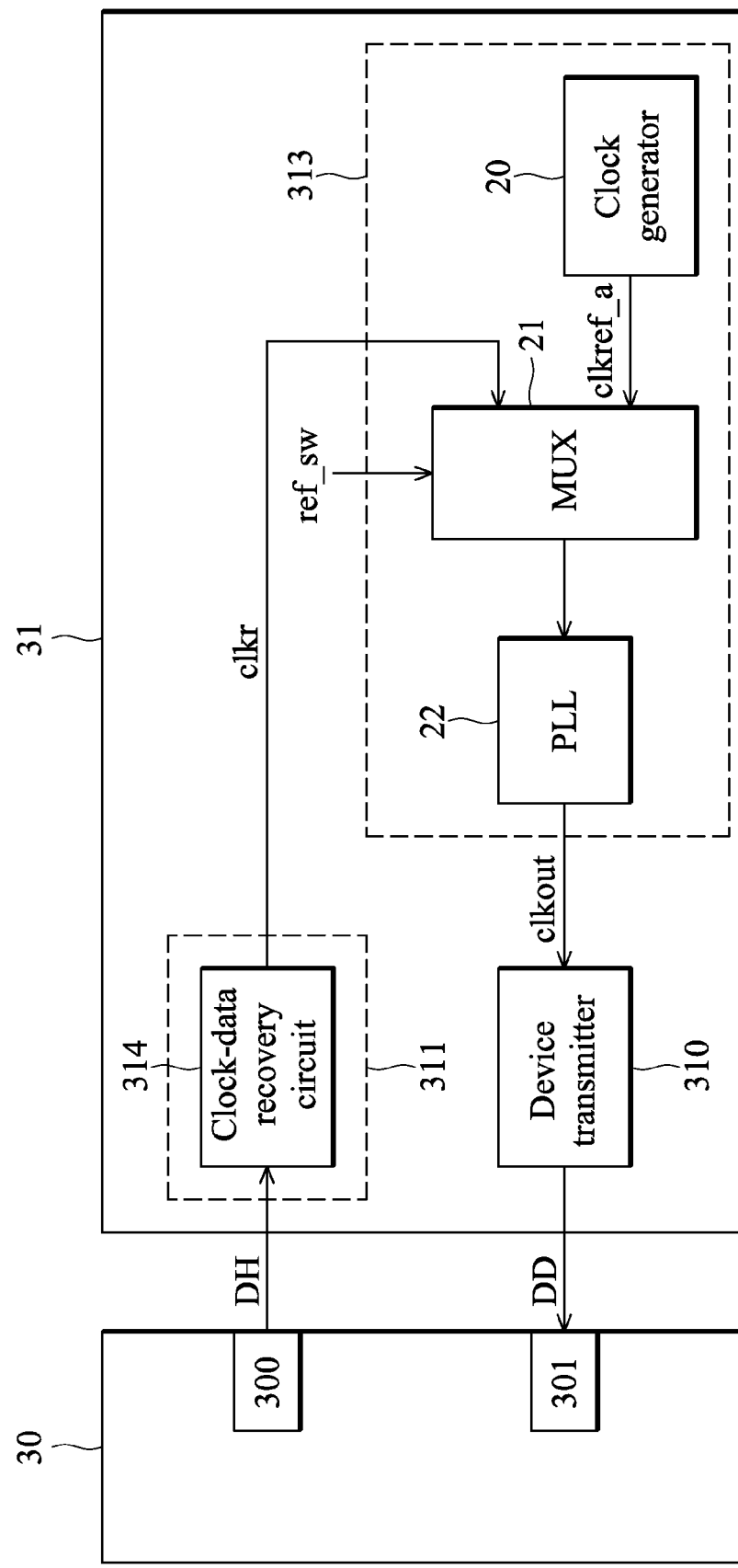
FIG. 6 shows another exemplary embodiment of a communication system.

In some embodiments, the host clock signal clkr generated by the clock-data recovery circuit 314 is directly provided to the multiplexer 21, as shown in FIG. 6. Thus, the divider 312 in FIG. 3 or 4 can be omitted. The multiplexer 21 selectively transmits the host clock signal clkr or the clock signal clkref_a to the PLL 22 for generating the output clock signal clkout to the device transmitter 310.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A device communicating with a host, comprising:
    a receiver for receiving and recovering host data (DH) from the host to generate a host clock signal (clkr);
    a clock generator for generating a local clock signal;
    a phase locked loop (PLL) for generating an output clock signal (clkout); and
    a transmitter for transmitting device data according to the output clock signal,
    wherein before the receiver receives the host data, the PLL generates the output clock signal according to the local clock signal,
    wherein after the receiver receives the host data, the PLL generates the output clock signal according to the host clock signal when a frequency of the output clock signal generated according to the local clock signal is not within a range required for specification of the transmitter, and
    wherein the host clock signal (clkr) is different from the local clock signal, and the host clock signal is within the range required for the specification of the transmitter.

2. The device as claimed in claim 1 further comprising a multiplexer receiving the local clock signal and a reference clock signal derived from the host clock signal and transmitting the reference clock signal or the local clock signal to the PLL according to a switching signal.

3. The device as claimed in claim 1 further comprising a multiplexer receiving the host clock signal and the local clock signal and transmitting the host clock signal or the local clock signal to the PLL according to a switching signal.

4. The device as claimed in claim 1, wherein the clock generator is implemented by an on-board clock source.

5. The device as claimed in claim 1, wherein the receiver comprises a clock-data recovery circuit for recovering the host data to generate the host clock signal.

6. The device as claimed in claim 1 further comprising a divider for receiving the host clock signal and dividing the frequency of the host clock signal to generate the reference clock signal.

7. The device as claimed in claim 6, wherein before the PLL switches to generate the output clock signal according to the host clock signal, the divider is reset by the switching signal.

8. A communication system, comprising:
    a host comprising a host transmitter and a host receiver, wherein the host transmitter transmits host data; and
    a device for communicating with the host and receiving the host data, wherein the device comprises:

a device receiver for receiving and recovering the host data to generate a host clock signal;

a clock generator for generating a local clock signal;

a phase locked loop (PLL) for generating an output clock signal; and a device transmitter for transmitting device data to the host transmitter according to the output clock signal, wherein before the device receiver receives the host data from the host transmitter, the PLL generates the output clock signal according to the local clock signal, wherein after the device receiver receives the host data from the host transmitter, the PLL generates the output clock signal according to the host clock signal when a frequency of the output clock signal generated according to the local clock signal is not within a range required for specification of the transmitter, and wherein the host clock signal is different from the local clock signal, and the host clock signal is within the range required for the specification of the transmitter.

9. The communication system as claimed in claim 8 further comprising a multiplexer receiving the local clock signal and a reference clock signal derived from the host clock signal and transmitting the reference clock signal or the local clock signal to the PLL according to a switching signal.

10. The communication system as claimed in claim 8, wherein the device further comprises a multiplexer receiving the host clock signal and the local clock signal and transmitting the host clock signal or the local clock signal to the PLL according to a switching signal.

11. The communication system as claimed in claim 8, wherein the clock generator is implemented by an on-board clock source.

* * * * *